UNITED STATES PATENT OFFICE.

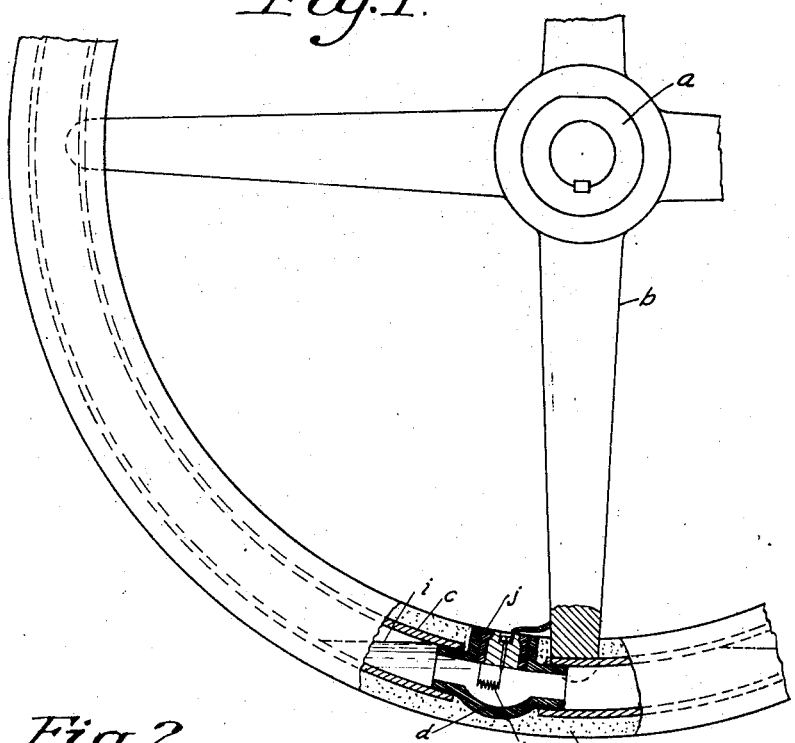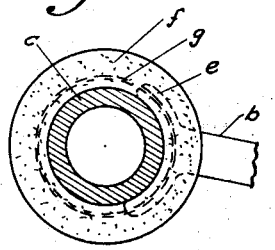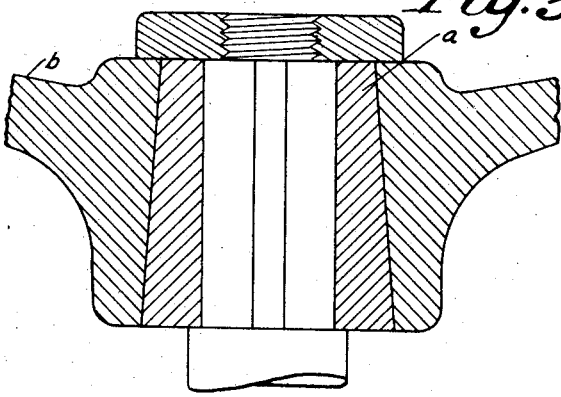

ARTHUR L. SENN, OF SEATTLE, WASHINGTON.

ELECTROVAPOR-HEATED STEERING-WHEEL.

1,388,488. Specification of Letters Patent. Patented Aug. 23, 1921.

Application filed May 24, 1920. Serial No. 383,966.

*To all whom it may concern:*

Be it known that I, ARTHUR L. SENN, a citizen of the United States of America, and resident of the city of Seattle, in the county of King and State of Washington, have invented certain new and useful Improvements in Electrovapor-Heated Steering-Wheels, of which the following is a specification.

My invention relates to a steering wheel for vehicles and its object is to so construct a steering wheel that it may be heated as desired, to thereby contribute to the comfort of the driver of the vehicle.

The invention comprises certain novel features of construction which have been illustrated in the drawings and which construction will be herein described.

Figure 1 of the drawings shows a plan view of a quarter section of my steering wheel.

Fig. 2 shows a cross-section of the rim, illustrating its construction.

Fig. 3 is a section through the hub of the wheel, illustrating a preferred manner of adapting my wheel for application to cars of different makes.

In operating motor vehicles the driver's hands will become very cold unless well protected. At times even with good gloves the hands become quite cold. It has been the object of my present invention to provide means whereby the rim of the wheel itself may be heated so as to thereby assist the driver in keeping his hands warm. In carrying out my invention I employ a wheel rim which is tubular or hollow and in this rim, preferably at the point in the periphery thereof which is lowermost when the wheel is in the position of maximum use, is provided an electrically heated element. I also provide in the chamber contained within the tubular rim, a small amount of a liquid which will be heated by the heating member and the vapor formed by such heating will circulate through the remainder of the chamber and thus the entire rim may be heated from a common heating member located at one restricted point in the rim.

The wheel rim, as shown, consists of a section of tubing 6 bent into a circular shape but with its ends somewhat separated. This metal tube would ordinarily be covered by a layer, as $f$, of some other material than metal, as, for instance, a paste or composition which can be molded or shaped thereon. At $g$ I have shown a reinforcing layer which may be of fiber, wire, or any suitable reinforcing material.

The separated ends of the tube $c$ are connected by a member $d$ which is herein shown as provided at opposite ends, respectively, with right hand and left hand threads and the tube $c$ is also provided with complemental threads so that the connecting member $3$ screws into each end of the tube. In so far as the action of my device as a heating device is concerned, the manner of connecting the heating element in the rim is largely immaterial.

The connecting member $d$ is shown as provided with a neck which is provided with an opening so that the member $d$ as a whole is of a shape somewhat resembling a T-coupling. This opening is provided with a closure, as a plug $g$, which carries the electrical heating element $h$. The latter projects into the main opening in the connecting member $d$.

In operating my device I prefer to employ a small portion only of the heating liquid, as $i$, which is placed within the chamber contained in the rim. The amount of liquid, as illustrated, is sufficient to well fill the connecting member $d$. The heating element $h$ thus extends into the liquid and heats it. When sufficiently heated, vapor, as steam, will be generated and this will fill the remainder of the chamber, thus heating the entire periphery of the wheel.

The heating element is located at the point in the periphery of the wheel which is down when the wheel is in the position of maximum use. This point, in an automobile, would be the point in the wheel which is down when the car is running straight ahead. This is at or closely adjacent to the point where the wheel is engaged by the hands of the driver. The liquid contained in the rim will flow so as to remain at the lower part of the rim when the wheel is turned for steering. In this way the heat of the liquid will be directly communicated by conduction to the tube at all points extending all around the wheel, if there be much turning of the wheel. Even without this, the steam generated will heat the upper parts of the wheel.

The use of the current for heating purposes may be controlled by a switch located at any convenient point and the driver may switch this on or off as may be necessary to properly control the heating of the wheel.

What I claim as my invention is:

1. A steering wheel having a hollow rim forming a closed chamber, a heat-conveying liquid in said chamber, and an electrical heating element positioned to heat said liquid.

2. A steering wheel having a hollow rim forming a closed chamber, a heat conveying liquid in said chamber, and a removable electrical heating member extending into the said chamber to heat the liquid therein.

3. A steering wheel having a hollow rim forming a closed chamber adapted to hold a heating liquid and an electrical heating member located adjacent to the point in said chamber which is lowermost when the wheel is in its position of maximum use and adapted to heat said liquid.

4. A steering wheel having a tubular rim, a removable electrical heating means located at one point in the periphery thereof and a liquid in said rim for conveying the heat from this point to the remainder of the circle of the rim.

A. L. SENN.

Witnesses:
 RUTH W. MILLS,
 E. B. HORN.